United States Patent [19]

Enomoto

[11] Patent Number: 5,137,131
[45] Date of Patent: Aug. 11, 1992

[54] WET MULTIPLE DISK CLUTCH APPARATUS WHICH IS USED IN VEHICLES

[75] Inventor: Hirokazu Enomoto, Kosai, Japan
[73] Assignee: Fuji Tekko Co., Ltd., Kosai, Japan
[21] Appl. No.: 700,806
[22] Filed: May 16, 1991

[30] Foreign Application Priority Data

Dec. 11, 1990 [JP] Japan .................................. 2-400318

[51] Int. Cl.⁵ ....................... F16D 13/68; F16D 13/69
[52] U.S. Cl. ............................... 192/70.14; 192/70.19; 192/70.28
[58] Field of Search ............... 192/70.14, 70.16, 70.19, 192/70.2, 70.28

[56] References Cited

U.S. PATENT DOCUMENTS

| | | | |
|---|---|---|---|
| 2,738,864 | 3/1956 | Becker | 192/70.14 |
| 3,249,189 | 3/1966 | Schjolin et al. | 192/70.28 X |
| 3,841,452 | 10/1974 | Newsock et al. | 192/70.2 X |
| 3,994,378 | 11/1976 | Schwäbe et al. | 192/70.28 |
| 4,225,026 | 9/1980 | Yamamori et al. | 192/70.2 |
| 4,548,306 | 10/1985 | Hartz | 192/70.28 |
| 4,676,356 | 6/1987 | Beccaris et al. | 192/70.28 |

Primary Examiner—Richard Lorence
Attorney, Agent, or Firm—Wenderoth, Lind & Ponack

[57] ABSTRACT

A wet multiple disk clutch apparatus for use in vehicles has an input shaft; a clutch drum mounted on the input shaft; a plurality of first clutch plates positioned in the clutch drum and movable in an axial direction of the clutch drum and restricted against rotation; an output shaft; a hub fixed to the output shaft; a plurality of second clutch plates movably mounted on the hub for movement in the axial direction of the hub and restricted against rotation and with one second clutch plate positioned between each adjacent pair of first clutch plates; an actuator on the clutch drum for pressing the first and second clutch plates in the axial direction for pressing them together in clutching engagement; a plurality of guide holes opening out of the clutch drum at positions spaced at intervals around the clutch drum and each guide hole extending in the axial direction of the clutch drum, each of the first clutch plates having a plurality of pairs of projections on the outer periphery and extending into corresponding guide holes; and a plurality of spring members, one positioned in each of the gaps between respective ones of the plurality of first clutch plates and normally urging the first clutch plates in a direction so as to widen the gaps between the first clutch plates, each spring member being a pair of leaf springs with both ends bent out of the plane of the leaf spring in the same direction, and the pair of leaf springs being engaged back to back at a center portion thereof, the ends of the leaf springs abutting respective projections of the pairs of projections on the periphery of adjacent first clutch plates, the leaf springs being loosely movably mounted for movement in the same direction as the clutch plates and independently of the clutch plates.

3 Claims, 7 Drawing Sheets

WET MULTIPLE DISK CLUTCH APPARATUS WHICH IS USED IN VEHICLES

BACKGROUND OF THE INVENTION

The present invention relates to a wet multiple disk clutch apparatus which drives a piston by hydraulic pressure and connects and disconnects a transmission of a motive power source and, more particularly, to a wet multiple disk clutch apparatus for connecting and disconnecting a motive power source which is applied to an automatic transmission of a vehicle.

DESCRIPTION OF THE RELATED BACKGROUND ART

Hitherto, as a wet multiple disk clutch for connecting and disconnecting a motive power which is applied from an engine to an automatic transmission of a vehicle, for instance, a clutch as shown in FIG. 1 has been known.

In FIG. 1, reference numeral 10 denotes a clutch drum to which a motive power rotation is supplied. A plurality of steel plates 14 are arranged in the clutch drum 10. Projections 16 formed on the outer peripheral side of the steel plates 14 are fitted into a guide hole 18 in the outer peripheral axial direction of the clutch drum 10, thereby enabling the steel plates 14 to be rotated integrally with the clutch drum 10.

A hub 12 is relatively rotatably mounted on the rotational center of the clutch drum 10. A plurality of facing plates 20 are provided on the hub 12. The steel plates 14 of the clutch drum 10 and the facing plates 20 of the hub 12 are alternatively arranged.

When the clutch is turned on, a piston 22 on the side of the clutch drum 10 is driven in the axial direction by supplying hydraulic pressure into a piston chamber 24 and the steel plates 14 and facing plates 20 are pressed together so that a clamping coupling state with frictional contact is obtained and a motive power is transferred from the clutch drum 10 to the hub 12.

In such a conventional wet multiple disk clutch apparatus, it is necessary to keep a gap t so as to prevent the steel plates 14 and the facing plates 20 from coming into contact with each other when the clutch is turned off. Therefore, the amount of movement of the piston is determined so as to move the piston 22 rearwardly by only a distance corresponding to the sum of the gaps t when the clutch is turned off.

However, since the gaps t between the steel plates 14 and the facing plates 20 are small and are not uniform, even if the piston 22 is moved to the clutch-off position, some of the plurality of steel plates 14 and facing plates 20 are left in contact, so that there is a problem that a dragging torque is generated and the transmission of the motive power cannot be completely cut off.

SUMMARY OF THE INVENTION

It is an object of the invention to provide a wet multiple disk clutch apparatus in which by uniformly widening gaps between clutch plates, the generation of a dragging torque and the corresponding rotation of an output shaft is prevented.

Another object of the invention is to provide a wet multiple disk clutch apparatus which can uniformly produce gaps at the time of turn-off of the clutch by interposing leaf springs between clutch plates.

Still another object of the invention is to provide a wet multiple disk clutch apparatus which makes such gaps uniform by inserting two leaf springs the back surfaces of which are engaged between clutch plates.

A further object of the invention is to provide a wet multiple disk clutch apparatus in which leaf springs for making gaps between clutch plates uniform are mounted on guide pins and are arranged among a plurality of clutch plates.

A wet multiple disk clutch apparatus according to the invention which is used in vehicles comprises: a clutch drum fixed to an input shaft; a plurality of first clutch plates which are assembled on the clutch drum so as to be restricted in a rotating direction and movable in an axial direction; a hub fixed to an output shaft; a plurality of second clutch plates which are assembled on the hub so as to be restricted in the rotating direction and movable in the axial direction and are alternately arranged with the plurality of first clutch plates; an actuator having a piston for pressing the first and second clutch plates in the axial direction in response to hydraulic pressure; and a plurality of spring members which are interposed in the gaps among the plurality of first clutch plates and which press the plates in such a direction as to push the plates apart and widen the gaps between the plates.

Practially speaking, a guide portion of the clutch drum is open in the axial direction of the outer periphery, and rotation in the axial direction of the first clutch plate is restricted by inserting a pair of projections formed on the outer periphery into the guide portions, and the leaf springs are arranged among the projections of the plurality of first clutch plates located in the guide portion.

Guide portions which are open in the axial direction are formed at a plurality of positions on the outer periphery of the clutch drum. A pair of projections are formed at each of a plurality of positions on the outer periphery of the first clutch plates corresponding to the guide portions.

As a spring member which is arranged between the first and second clutch plates, a pair of leaf springs both edges of which are bent are arranged between the projections of a plurality of first clutch plates in a state in which the back surfaces of the leaf springs are engaged.

The leaf springs have a pair of through holes at central positions. A pair of guide pins extend into the pair of through holes and are supported in the guide portion of the clutch drum.

Further, the first clutch plates are steel plates and the second clutch plates are facing plates.

The above and other objects, features, and advantages of the present invention will become apparent from the following detailed description with reference to the drawings.

DETAILED DESCRIPTION OF THE PREFERRED EMBODIMENT

Figure 1:
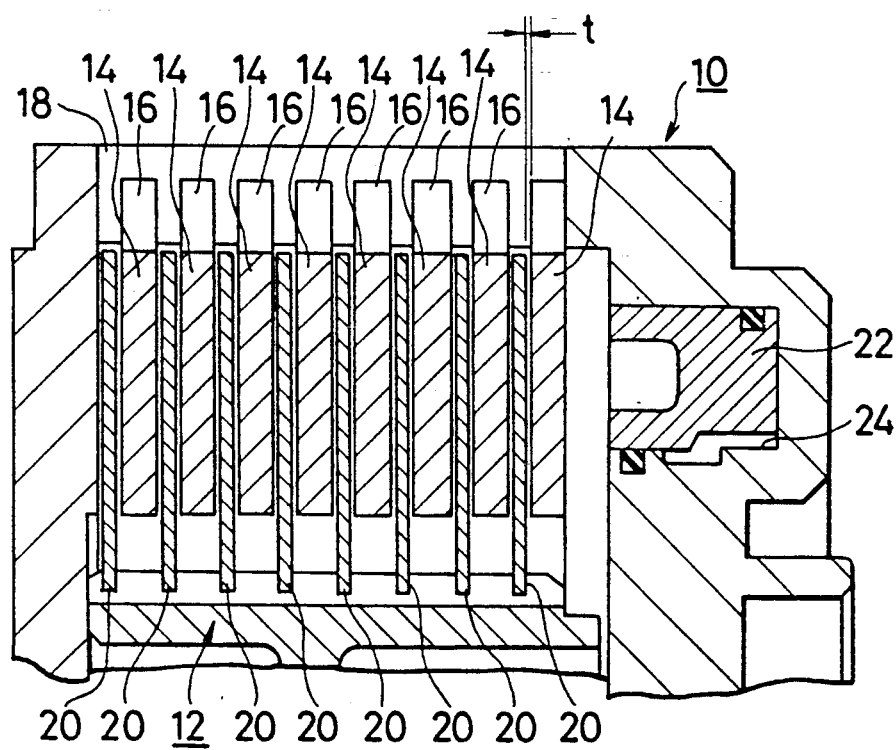
FIG. 1 is an explanatory diagram of a conventional wet clutch apparatus.
Figure 2:
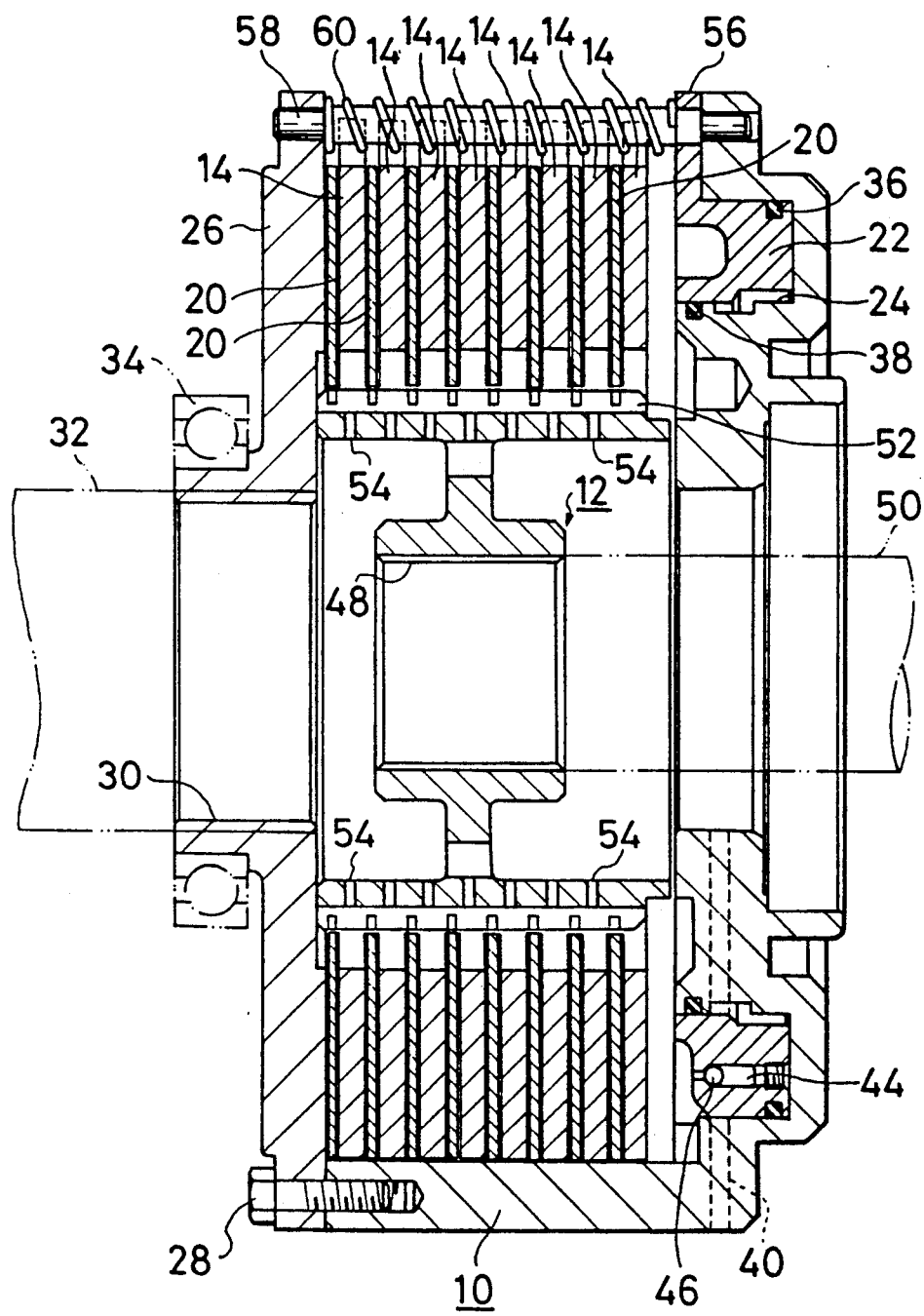
FIG. 2 is a cross-sectional view showing an embodiment of the invention.
Figure 3:
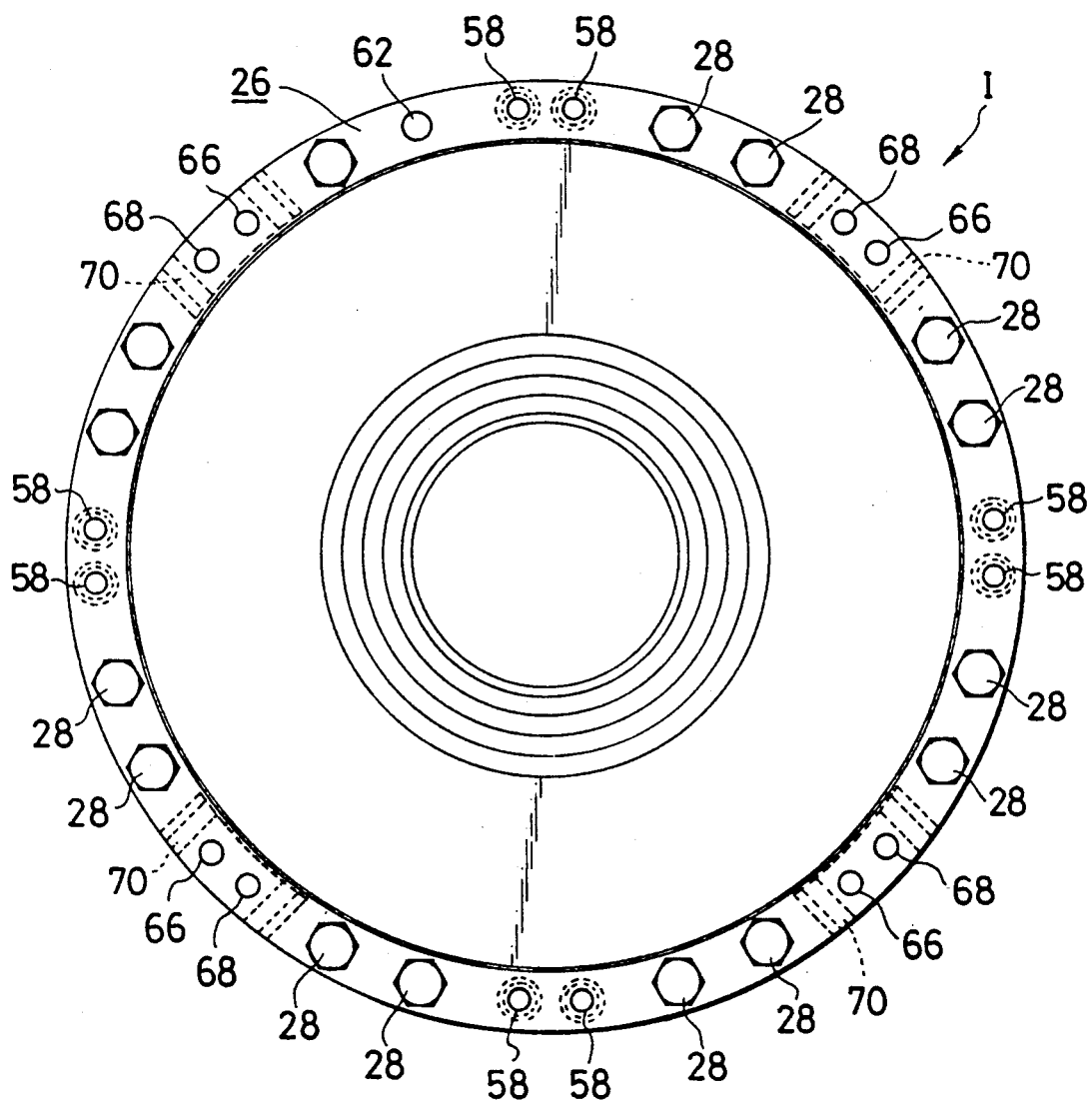
FIG. 3 is an end view seen from the input shaft side in FIG. 2.

In FIGS. 2 and 3, reference numeral 10 denotes a clutch drum having a cylindrical shape which is open on the left side. An end plate member 26 is fixed over the open end by bolts 28.

The end plate member 26 has a spline shaft hole 30 in the central part. An input shaft 32 is fitted into the spline shaft hole 30. The outside portion of a flange around the spline shaft hole 30 is rotatably supported on a casing (not shown) by a bearing 34.

The hub 12 is arranged in the clutch drum 10. The hub 12 is relatively rotatably arranged in the clutch drum 10 on an output shaft 50 extending into a central spline shaft hole 48. A spline 52 for holding the clutch plates is formed on the outer periphery of the hub 12. A plurality of oil holes 54 for lubrication are formed in the portion of the spline 52 of the hub 12.

A plurality of steel plates 14 are slidably mounted for movement in the axial direction on the clutch drum 10. A plurality of facing plates 20 are arranged on the hub 12 alternately with the steel plates 14.

An annular piston chamber 24 is formed in the right end of the clutch drum 10. The ring-shaped piston 22 is mounted on the piston chamber 24 so as to be slidable in the axial direction of the drum. Reference numerals 36 and 38 denote seal rings of the piston 22.

As shown by a broken line in the lower right portion of FIG. 2, a passage 40 extends out of the piston chamber 24. Hydraulic pressure fluid is supplied from the outside into the passage 40. An inner passage 44 is provided in the lower part of piston 22. A drift ball valve 46 is mounted in the inner passage 44. The drift ball valve 46 prevents the condition that when centrifugal force is applied to oil remaining in the piston chamber 24 after the supply of the hydraulic pressure fluid has been stopped, a hydraulic pressure is generated and the piston 22 is pressed outwardly.

Further, a projecting portion 56 integrally formed on the upper part of the piston 22 is visible at the top of FIG. 2. A guide pin 58 extends through the projecting portion 56 and between the projecting portion 56 and the end plate member 26. A return spring 60 is mounted around the guide pin 58.

FIG. 3 shows the end surface of the end plate member 26 in FIG. 2. The end plate member 26 is positioned on the clutch drum 10 by a positioning pin 62 and is clamped and fixed by the plurality of bolts 28. There are four sets of guide pins 58 each with a return spring 60 engaging the piston 22. The guide pins are provided at upper, lower, right and left positions.

Figure 4:
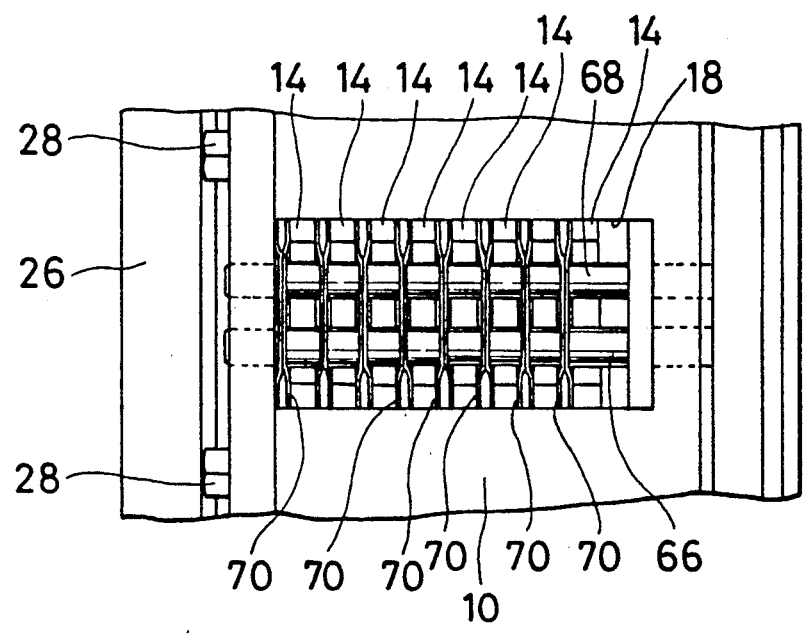
FIG. 4 is a plan view seen from the direction I in FIG. 3.

FIG. 4 is a plan view of an assembly of the spring members and plates 14 seen from the direction I in FIG. 3.

In FIG. 4, a rectangular guide hole 18 opens out of the outer periphery of the clutch drum 10 and extends in the axial direction.

Two further guide pins 66 and 68 are visible through the guide hole 18 and are mounted in a manner similar to the guide pins 58 for the return springs 60 in FIG. 2. A plurality of leaf springs 70 are slidably mounted on the guide pins 66 and 68 and are interposed between pairs of steel plates 14 in pairs of two leaf springs abutting each other on the back surfaces thereof.

Figure 5:
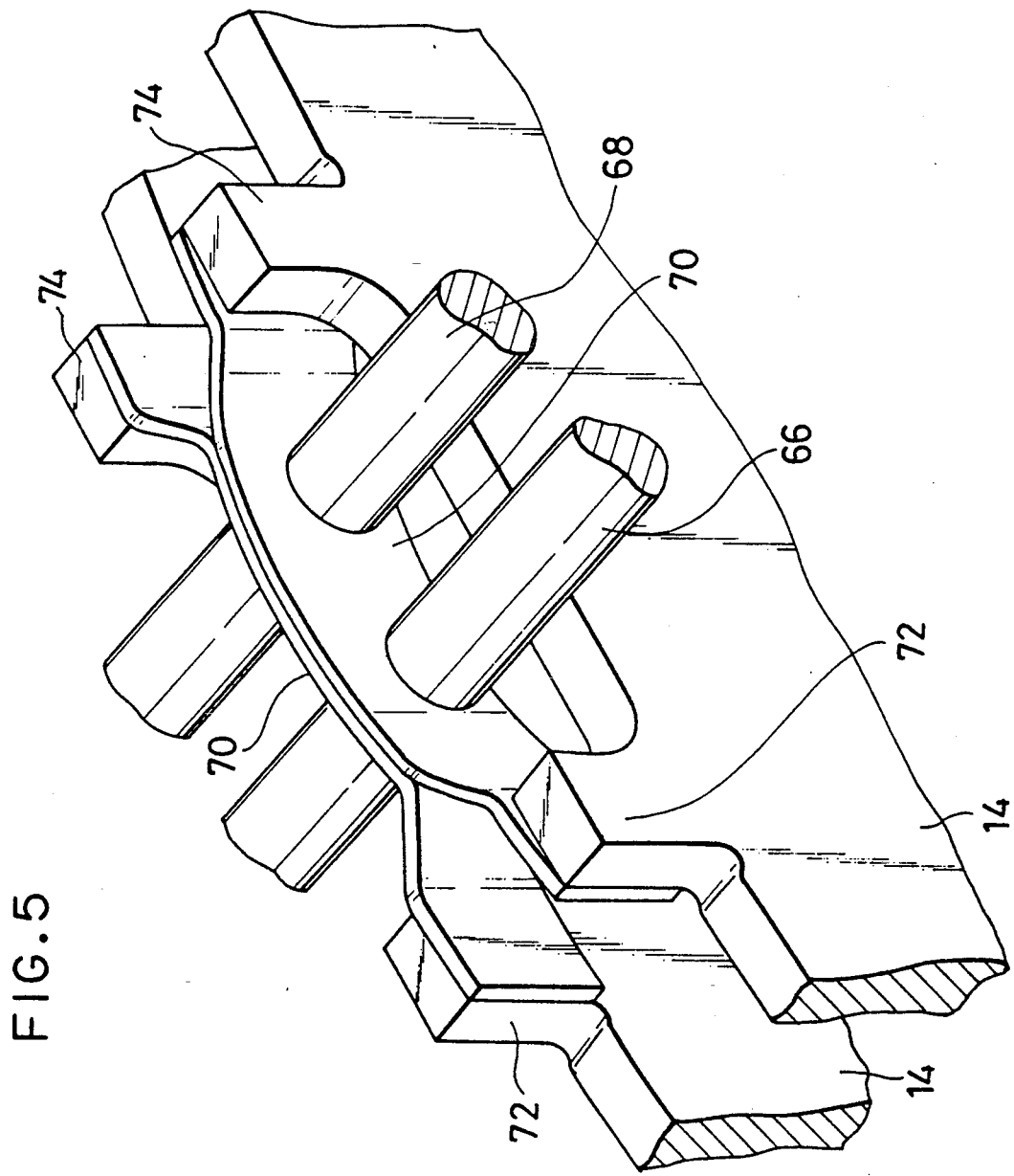
FIG. 5 is a perspective view on an enlarged scale of a part of FIG. 4.
Figure 6:
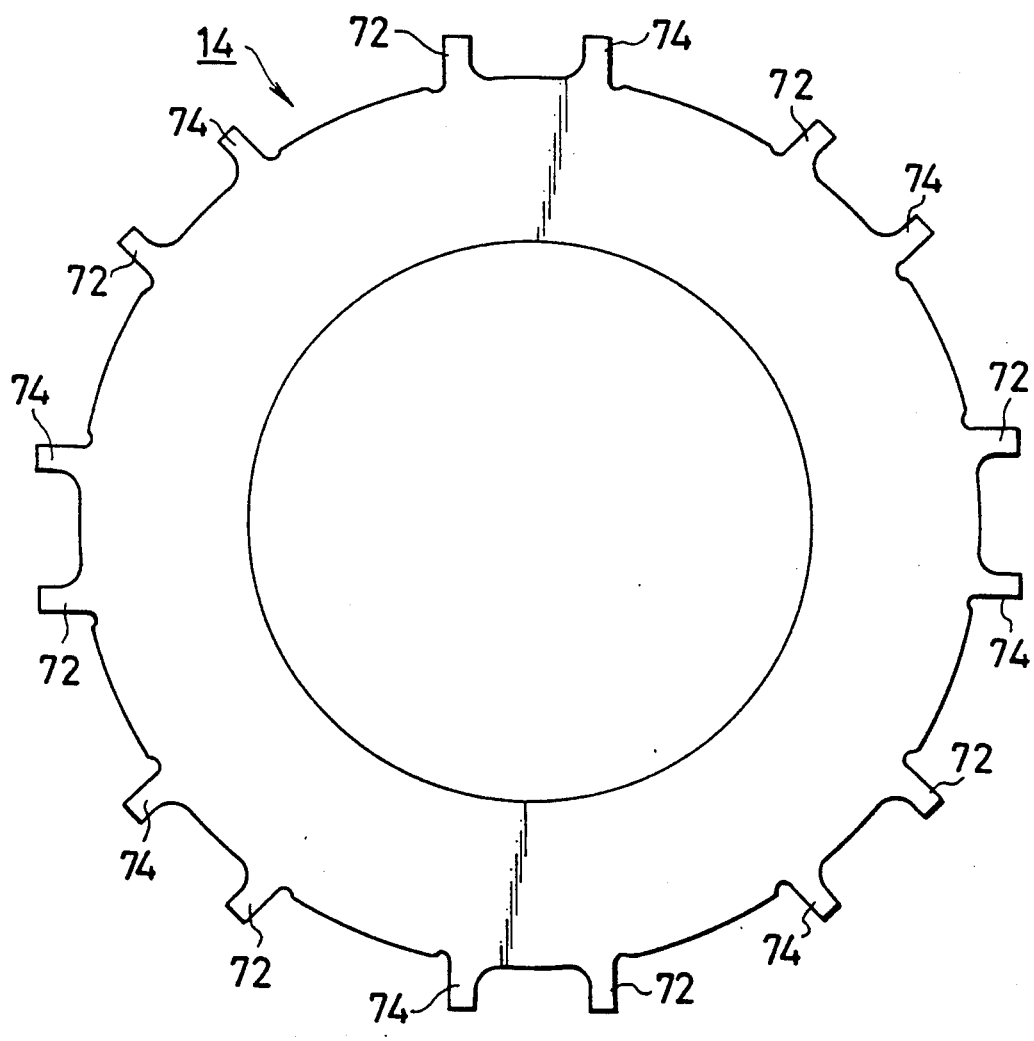
FIG. 6 is an explanatory diagram showing a steel plate of the clutch shown in FIG. 2.

FIG. 5 shows on an enlarged scale the manner of mounting the leaf springs. A pair of projections 72 and 74 are formed on the outer periphery of the steel plates 14. As shown in FIG. 6, eight pairs of such projections 72 and 74 are formed at eight positions at regular intervals around the outer periphery of the steel plates 14. A guide hole 18 is provided at the position of each pair of projections. The projections 72 and 74 engage the axially extending edges of the holes 18 for guiding axial movement of the plates 14 in the clutch drum.

The guide pins 66 and 68 extend between the projections 72 and 74 of the steel plates 14 at four positions, as shown in FIG. 3. The guide pins 66 and 68 extend through the pair of leaf springs 70 and the back surfaces of the leaf springs abut each other.

Figure 7:
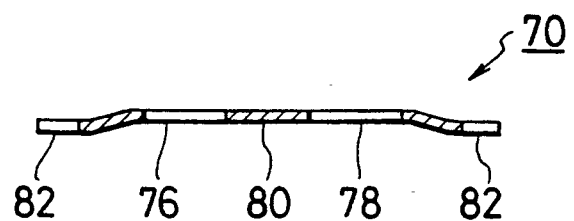
FIG. 7 is a cross-sectional view of a leaf spring.
Figure 8:
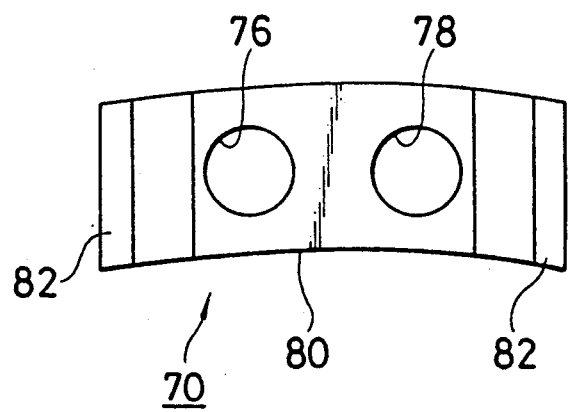
FIG. 8 is a front view of a leaf spring.

As shown in FIGS. 7 and 8, each leaf spring 70 has a pair of holes 76 and 78 to receive the guide pins 66 and 68. End portions 82 are formed by bending both ends of a leaf spring main body 80 out of the plane of the main body. The back surfaces of the leaf spring main bodies 80 are abutted. A set of such leaf springs 70 have the ends 82 between the opposed projections 72 and 74 of two adjacent steel plates 14. Therefore, the curved end portions 82 of the leaf springs 70 urge the steel plates 14 apart, so that the gap between the adjacent steel plates 14 is made uniform when the clutch is turned off.

As will be understood from FIG. 3, a set of leaf springs 70 for making the gap between the steel plates 14 uniform is provided at each of the four positions of the guide pins 66 and 68, the leaf springs 70 being shown by broken lines.

A guide hole 18 which opens out of the periphery of the clutch drum 10 like that shown in FIG. 4 is also provided at the four positions of the return springs 60 on the guide pins 58 as shown in FIG. 3.

The operation of the clutch will now be described.

First, when the clutch is turned on, by supplying hydraulic fluid under pressure through the passage 40 into the piston chamber 24, the piston 22 is moved leftward to press the steel plates 14 and the facing plates 20 together, so that the plates are clamped together. Therefore, the motive power is transferred from the input shaft 32 to the output shaft 50 through the clutch drum 10, steel plates 14, facing plates 20, and hub 12.

At this time, the leaf spring 20 between the projections 72 and 74 of the steel plates 14 are also compressed by the projections 72 and 74 as the plates 14 are moved closer together. Springs 60 are similarly compressed by movement of the piston 22 toward end plate member 26.

When the clutch is turned off, the pairs of leaf springs 70 supported by the guide pins 66 and 68 are interposed between the pairs of projections 72 and 74 on the steel plates 14 expand to open the gap between the steel plates 14 as the piston 22 retracts, thereby producing substantially uniform gaps between the plates 14 which are sufficient to space them from the facing plates 20.

Therefore, the generation of the dragging torque and rotation of the output shaft 50 can be prevented.

What is claimed is:

1. A wet multiple disk clutch apparatus for use in vehicles, comprising:
   an input shaft;
   a clutch drum mounted on said input shaft;
   a plurality of first clutch plates positioned in said clutch drum and movable in an axial direction of said clutch drum and restricted against rotation;
   an output shaft;
   a hub fixed to said output shaft;

a plurality of second clutch plates movably mounted on said hub for movement in the axial direction of said hub and restricted against rotation and with one second clutch plate positioned between each adjacent pair of first clutch plates;

an actuator on said clutch drum for pressing said first and second clutch plates in the axial direction for pressing them together in clutching engagement;

a plurality of guide holes opening out of said clutch drum at positions spaced at intervals around said clutch drum and each guide hole extending in the axial direction of said clutch drum, each of said first clutch plates having a plurality of pairs of projections on the outer periphery and extending into corresponding guide holes; and a plurality of spring members, one positioned in each of the gaps between respective ones of the plurality of first clutch plates and normally urging said first clutch plates in a direction so as to widen the gaps between said first clutch plates, each said spring member being a pair of leaf springs with both ends bent out of the plane of the leaf spring in the same direction, and the pair of leaf springs being engaged back to back at a center portion thereof, said ends of the leaf springs abutting respective projections of the pairs of projections on the periphery of adjacent first clutch plates, said leaf springs being loosely movably mounted for movement in the same direction as the clutch plates and independently of the clutch plates.

2. An apparatus as claimed in claim 1 wherein said leaf springs have a pair of through holes in the center portions thereof, and said clutch drum having a plurality of pairs of guide pins mounted thereon and extending parallel to the axis of said shafts and at positions corresponding to said guide holes, said pair of leaf springs being loosely slidably mounted on said guide pins.

3. An apparatus as claimed in claim 1 wherein said first clutch plates are steel plates and said second clutch plates are facing plates.

* * * * *